2,787,518
DEXTRAN SOLUTIONS

Malvern J. Hiler, Dayton, Ohio, assignor to The Commonwealth Engineering Company of Ohio, Dayton, Ohio, a corporation of Ohio No Drawing. Application September 20, 1955,
Serial No. 535,521

8 Claims. (Cl. 18—54)

This invention relates to solutions of dextran in aqueous boron trifluoride and suitable for use, among other purposes, as textile finishes and in the production of shaped objects such as filaments, yarns, films, etc.

Dextran is a high molecular weight polysaccharide of more or less branched structure and made up of anhydroglucopyranosidic units joined by molecular structural repeating linkages at least 50%, and usually the majority of which, are alpha-1,6 linkages. It may vary widely with respect to the ratio of alpha-1,6 to non-1,6 linkages, its molecular weight and sensitivity to water, and may be readily water-soluble, difficultly water-soluble or substantially water-insoluble.

Dextran may be obtained in various ways including bacterial conversion of 1,4 linkages of dextrin to 1,6 linkages of dextran. Usually, it is biosynthesized from sucrose. Thus, a suitable dextran-producing bacterium, such as those of the *Leuconostoc mesenteroides* or *L. dextranicum* types may be cultivated and the whole culture, or a filtrate therefrom containing the enzyme elaborated by the bacterium, introduced into an aqueous culture medium containing sucrose and appropriate inorganic salts and nitrogenous material, the mass being held until the dextran is synthesized in maximum yield.

The dextran thus obtained normally has a high molecular weight calculated to be in the millions. It may be precipitated from the culture medium by means of a water-miscible aliphatic alcohol or ketone such as methanol, ethanol, isopropanol or acetone. The precipitate may be purified and reduced to powdered condition for solution thereof in the aqueous boron trifluoride.

Instead of using the high molecular weight dextran, lower molecular weight dextran may be used. The relatively low molecular weight dextran may be obtained directly by known methods in accordance with which the synthesis from sucrose is effected under controlled conditions using the enzyme and in the substantial absence of bacteria and cellular debris. As is known, this synthesis by the so-called "filtered enzyme" method can be conducted so that at least the major portion of the dextran obtained has a molecular weight ranging from 20,000 to 200,000 (average 60,000 to 80,000). Such dextran may be used in the present process. Or the native dextran may be partially hydrolyzed by acid or enzyme action to dextran of lower molecular weight. In general, the dextran may have a molecular weight between 5000 and that of the native product, determined by light scattering measurements.

In accordance with this invention, the selected dextran is treated with an aqueous solution of boron trifluoride of from 50% to 70% concentration, at temperatures of from 30° C. down to the freezing point of the solution, preferably between —5° C. and 20° C., and for a time sufficient to result in dissolution of the dextran.

The dextran may be reprecipitated from the solution by dilution with water or by contacting the solution with an alkaline medium and thus the solutions may be used to obtain filaments, films, tubes or other shaped articles by extruding the solution through an appropriate device into an aqueous setting bath.

The solution of the dextran in boron trifluoride may also be used as a textile finish. For example, when a woven cotton fabric is passed through a bath containing 5% of native (unhydrolyzed) dextran in a solution prepared by dissolving 60 parts by weight of boron trifluoride in 40 parts of water, and the fabric, after withdrawal from the bath, is rinsed with water and dried, for instance on a tenter, the fabric is characterized by a crisp finish similar to that of organdy.

The following examples are given to illustrate specific embodiments of the invention, it being understood that these examples are not intended as limitative.

Example I

Gaseous boron trifluoride is passed into water with external cooling of the vessel containing the water. When 200 parts of the fluoride have been absorbed by 100 parts of water, introduction of the gas is terminated and the mixture is cooled. Any boric acid crystals which form are separated by filtration, as through sintered glass.

About 5 parts of native unhydrolyzed water-soluble dextran in finely powdered form are stirred into 100 parts of the solution at room temperature. The dextran is completely dissolved in about 15 minutes. The solution is extruded through a spinneret into water at 40° C. to 60° C., to form a monofilament which is washed and dried. The final filament is more or less translucent and characterized by acceptable tenacity.

Example II

Gaseous boron trifluoride is passed into water as in Example I until a solution of about 60% of the trifluoride is obtained. The native dextran is dissolved rapidly, and the solution is extruded through a spinneret into water or dilute (3–10%) sodium hydroxide solution to form filaments.

Example III

A solution of about 50 parts of boron trifluoride in 42 parts of water is prepared. Native, water-soluble dextran is dissolved in the solution and may be reprecipitated therefrom in any desired shape by means of water or alkaline solution.

Example IV

A woven cotton fabric is parchmentized by passing it through a solution of 5% of native unhydrolyzed dextran in 65% aqueous boron trifluoride for a treating time of about 3 minutes. The fabric withdrawn from the bath is passed between squeeze rolls to remove excess treating solution, and then rinsed with running water and dried.

Example V

A length of paper is drawn through a treating bath comprising 5 parts of hydrolyzed dextran of molecular weight ranging from 20,000 to 200,000 (water-soluble) dissolved in 65% aqueous boron trifluoride. The paper leaving the bath is passed through squeeze rolls, rinsed in running water, and dried. It is markedly toughened by the treatment and has improved wet strength.

The boron trifluoride solutions which are preferably used in practicing the invention have concentrations corresponding approximately to the hydrates $BF_3 \cdot 2H_2O$ and $BF_3 \cdot 3H_2O$. When reference is made herein to the aqueous boron trifluoride solutions of given concentration, the possibility is not excluded that the boron trifluoride exists in solution as a hydrate or as a hydrofluoric or fluoroboric acid.

The solutions may contain from 5% to 35% or even a somewhat larger amount of dextran. Usually the dextran is dissolved in the aqueous boron trifluoride to the extent of 5% to 15%.

The solutions of the dextran in aqueous boron trifluoride may be applied to various types of textiles or paper, and to textiles, including so-called non-woven fabrics, comprising or consisting of various kinds of fibers, natural, artificial and synthetic, including cotton, regenerated cellulose, nylon and the like. Application of the solution to the textile may be combined with mechanical treatment of the latter. For example, a fabric may be held under tension during the treatment or it may be held without tension. When tension is not applied, the fabric may undergo shrinkage especially if it is a cotton or regenerated cellulose fabric. Such shrinkage may result in crepe-like effects or in the production of felt-like products which may be calendered to provide them with a smooth surface. Filaments formed from the solutions may be given a stretch during or after spinning. Other variations and modifications may also be made, as will be apparent to those skilled in the art. Since such variations and modifications may be made in practicing the invention without departing from the spirit and scope thereof, it is to be understood that the invention is not to be limited except as defined in the appended claims.

What is claimed is:

1. As a new composition of matter, a solution of dextran in aqueous boron trifluoride.

2. A spinning solution consisting essentially of dextran dissolved in aqueous boron trifluoride.

3. A finish for textiles, paper and the like consisting essentially of dextran dissolved in aqueous boron trifluoride.

4. A method of treating textiles, paper and the like, which comprises applying thereto a solution of dextran in aqueous boron trifluoride, and then rinsing and drying the treated article.

5. A method of forming shaped articles of dextran which comprises dissolving the dextran in aqueous boron trifluoride and extruding the solution through a suitable shaping device into an aqueous setting bath.

6. A method of forming shaped articles of dextran which comprises dissolving the dextran in aqueous boron trifluoride and extruding the solution through a suitable shaping device into a setting bath comprising water.

7. A method of forming shaped articles of dextran which comprises dissolving the dextran in aqueous boron trifluoride and extruding said solution through a suitable shaping device into a setting bath comprising an aqueous alkaline solution.

8. A method of forming shaped articles of dextran which comprises dissolving the dextran in aqueous boron trifluoride and extruding said solution through a suitable shaping device into a setting bath comprising aqueous sodium hydroxide.

References Cited in the file of this patent
UNITED STATES PATENTS

| | | |
|---|---|---|
| 2,674,517 | Deniston | Apr. 6, 1954 |
| 2,702,231 | Deniston | Feb. 15, 1955 |